United States Patent [19]

Virtanen

[11] Patent Number: 6,035,179
[45] Date of Patent: Mar. 7, 2000

[54] TRANSMISSION OF VOICE-FREQUENCY SIGNALS IN A MOBILE TELEPHONE SYSTEM

[75] Inventor: Anu Virtanen, Espoo, Finland

[73] Assignee: Nokia Telecommunications Oy, Espoo, Finland

[21] Appl. No.: 08/913,591

[22] PCT Filed: Apr. 2, 1996

[86] PCT No.: PCT/FI96/00181

§ 371 Date: Sep. 19, 1997

§ 102(e) Date: Sep. 19, 1997

[87] PCT Pub. No.: WO96/32817

PCT Pub. Date: Oct. 17, 1996

[30] Foreign Application Priority Data

Apr. 12, 1995 [FI] Finland ................................ 951765

[51] Int. Cl.$^7$ .................................................. H04B 1/10
[52] U.S. Cl. ............................................. 455/63; 455/296
[58] Field of Search .................................. 455/422, 403, 455/517, 67.1, 570, 227, 229, 67.3, 63, 296; 379/5, 6, 283, 386; 370/529, 525, 526, 433, 435, 287, 477; 704/228, 227, 226, 231

[56] References Cited

U.S. PATENT DOCUMENTS 4,782,485 11/1988 Gollub ................................... 370/477
5,018,136 5/1991 Gollub ................................... 370/477
5,835,486 11/1998 Davis et al. ........................... 370/287

FOREIGN PATENT DOCUMENTS 534 852 3/1993 European Pat. Off. .
2 290 005 12/1995 United Kingdom .
93/10623 5/1993 WIPO .

OTHER PUBLICATIONS

Multifrequency Signalling System to be Used for Push–Button Telephones, T/WG II "Switching and Signalling" (CS), T/CS 46–02 (Innsbruck 1981, revised at Nice 1985) Ed. May 15, 1986, pp. 1–16.

*Primary Examiner*—Reinhard J. Eisenzopf
*Assistant Examiner*—Marsha D. Banks-Harold
*Attorney, Agent, or Firm*—Pillsbury Madison & Sutro LLP

[57] ABSTRACT

According to the invention, when detecting the same DTMF signal at the transmitting end, successive DTMF frames relating to this signal are established. These frames are modified SID frames, and individual linking information (Order, Start, Duration) is added to each frame in addition to DTMF signal frequence pair information. This linking information indicates the duration of the DTMF signal from the first detection time period of the first modifiedd SID frame to the frame concerned, including said frame. The individual linking information thus interlinks successive DTMF frames (frames 1–4) relating to the same DTMF signal. At the receiving end, in receiving DTMF frames, it is calculated at each error-free frame how long the DTMF signal has been received. Only when the individual linking information of a received frame indicates the duration of the DTMF signal is longer than the threshold value, for instance 40 ms, the DTMF signal indicated by the frequency pair inforamtion of the received frames is generated to a subscriber station. During the waiting period, background noise is generated.

13 Claims, 7 Drawing Sheets

| A | B | C |
|---|---|---|
| SID-identifier | background noise spectrum | background noise level |
| 95 | 36 | 24 |

| A | B | C | D | E | F | I |
|---|---|---|---|---|---|---|
| SID-identifier | background noise spectrum | background noise level | DTMF-identifier | DTMF-frequency pair code | DTMF-tone duration | |
| 95 | 36 | 24 | 8 | 4 | 4 | 89 BITS |

Fig. 4

|  | VAD flag | |
|---|---|---|
| | 0 | 1 |
| DTMF flag 0 | Infobits: SID-frame SP=0 | Infobits: Speech frame SP=1 |
| 1 | Infobits: DTMF-frame SP=1 | Infobits: DTMF-frame SP=1 |

Fig. 6

| A | B | C | D | E | F | G | H | I |
|---|---|---|---|---|---|---|---|---|
| SID-identifier | background noise spectrum | background noise level | DTMF-identifier | DTMF-frequency pair code | DTMF-frame order | DTMF-start in first frame | DTMF duration in this frame | |
| 95 | 36 | 24 | 13 | 4 | 3 | 2 | 2 | 81 |

Fig. 7

TRANSMISSION OF VOICE-FREQUENCY SIGNALS IN A MOBILE TELEPHONE SYSTEM

This application is the national phase of international application PCT/FI96/00181, filed Apr. 2, 1996 which designated the U.S.

FIELD OF THE INVENTION

The present invention relates to transmitting voice-frequency signals, especially DTMF signals, over the radio interface of a digital mobile telephone system.

BACKGROUND INFORMATION

In a digital telephone system, a speech signal is coded in some manner before it is channel coded and transmitted to the radio path. In speech coding, digitalized speech is processed frame by frame in periods of about 20 ms by using different methods in such a manner that the result is a group of parameters representing speech for each frame. This information, i.e. the parameter group, is channel coded and transmitted to the transmission path. In channel coding, the information is protected by different error correcting codes.

The speech coding method used in the GSM cellular system is the so-called RPE-LTP (Regular Pulse Excitation LPC with Long Term Prediction). The basic parts of the algorithm are the linear predictive coding filter LPC and residual signal coding as the last stage of the pulse sequence. The operation is completed by tone pitch estimation LP. The coder thus produces short term filter parameters, long term prediction parameters LTP, and RPE parameters. In a decoder, the RPE parameters act as a filter excitation signal, and the received short and long term parameters act as filter parameters. The speech coding algorithm employed by the digital cellular system in the USA belongs to the category of code excited coders CELP (Code Excited Linear Prediction), and the coder is referred to by the term Vector-Sum Excited Linear Predictive Coding (VSELP). The result of the speech coding is a group of parameters, by means of which and also by means of code books having a predetermined structure a speech signal is synthesized in the decoder of the receiver. The speech signal residual is not transmitted at all, as is done in a RPE-LTP coder. The coders of both systems have in common the fact that the coder produces speech frames the duration of which is 20 ms and that a speech frame consists of subframes of 5 ms, each of which contains a speech parameter group.

In addition to actual coding, the following functions are also built in in digital speech processing: a) on the transmitter side, voice activity detection (VAD), by means of which the transmitter can be activated only when there is speech to be transmitted (Discontinuous Transmission, DTX), b) on the transmitter side, background noise evaluation and generation of parameters corresponding to the noise, and on the receiver side, comfort noise generation in the decoder from the parameters, this comfort noise making an interruption in the connection sound more comfortable than absolute silence, and c) acoustic echo cancellation.

As an example of speech processing, speech processing arrangement used in the known GSM mobile telephone system is described with reference to FIG. 1 showing a transmitter side. The input of the speech coder 1 is either a 13-bit PCM signal arriving from the network, obtained by sampling an audio signal at a frequency of 8000 samples per second, or A/D converted 13-bit PCM arriving from the audio part of the mobile station. The duration of the speech frame obtained from the output of the coder is 20 ms and it comprises 260 bits, which are generated by coding 160 PCM coded speech samples.

The speech coder 1 produces the parameters mentioned above for each 20 ms speech frame, and the voice activity detector (VAD) 2 determines on the basis of these parameters whether the frame contains speech or not. According to the information contents of the frame, the VAD detector sets an appropriate flag controlling the operation of a DTX control and operation block 4. Its value may be VAD=1, the frames applied to a channel coder 5 and therefrom further to the radio path as so-called traffic frames being thus speech frames produced by the speech coder. The DTX control and operation block 4 sets a flag SP controlling channel coding for each frame applied to the channel coder 5.

In transmitting speech, background noise is also included in the speech, which background noise would also be interrupted in using discontinuous transmission DTX, which would cause disturbing interruptions at the receiving end. Therefore, SID (Silence Descriptor) frames containing noise parameters are transmitted after a speech burst and at certain intervals also during speech pauses indicated by the VAD 2, the receiver being thus able to generate noise resembling the original noise from these parameters also during pauses. The duration of such a frame and the number of bits in the frame are the same as those of a speech frame. The noise parameters are determined by a noise TX function block 3 on the basis of the parameters obtained from the speech coder 1.

According to FIG. 2 showing the fields of a SID frame, only part of the 260 bits of the SID frame are needed in coding the noise parameters. Background noise spectrum information is coded in field B, and background noise level is coded in field C. As regards the other bits, 95 bits are used for the SID code word, field A, and all the bits have the value zero in the word. The rest of the bits of the SID frame have the value zero, field I. When a pause occurs in the speech, i.e. the VAD flag is zero, it causes the fact that the frames transmitted from the DTX control and operation block 4 to the channel coder and further to the radio path as so-called traffic frames are SID frames containing noise parameters. The value of the SP flag adjusts the channel coding to be suitable for these frames.

FIG. 3 shows a known receiver arrangement used in the GSM mobile telephone system. Channel decoding and detection are performed on the received radio signal in a block 35. The detected traffic frame error-corrected in the channel decoding is provided with a flag BFI (Bad Frame Indicator), which indicates whether the received traffic frame is erroneous or error-free. As regards the traffic frame, it is checked in a SID frame detection block 36 whether a SID frame containing noise information is in question. This is performed by comparing the code word of the received traffic frame bit by bit with the code word stored in the receiver. Depending on how many bits deviate from the correct one, a SID flag is provided with one of three possible values. In addition, traffic frame synchronization information is provided by means of a TAF flag (Time Alignment Flag). The inputs of a DTX control and operation block 34 are thus the traffic frame information bits, erroneous/error-free information BFI concerning the frame, and notification whether the frame is a SID frame containing noise parameters. If the traffic frame is an error-free speech frame, it is applied to the input of a speech decoder 31, which generates the original speech on the basis of the parameters. If the traffic frame is classified as a bad or lost speech or SID frame on the basis of the BFI flag, some replacement procedure of bad speech frames is performed in a block 32 for instance by applying the latest good parameter values as attenuated to the speech decoder. If the traffic frame is an error-free SID frame, it is applied to a noise RX function block 33, which adjusts the speech decoder 31 to produce noise resembling the original noise for as long as speech frames are received again.

A basic characteristic of digital networks is that they do not let signals through like a conventional telephone network. They do not let through DTMF signals properly, let alone a signal of the V.29 modem used in fax machines. In a telephone network, DTMF (Dual Tone Multifrequency) signalling, contrary to dialling pulses, penetrates the entire connection all the way to the B subscriber, and this is why they are especially useful for use in remote controlling apparatuses, for instance in remote interrogating telephone answering machines or in voice coded data transmission. In DTMF signalling, two simultaneous voice frequencies are used to indicate a specific character. All digits 0–9 and the characters * and # are indicated as a combination of two different frequencies selected from frequencies 697 Hz, 770 Hz, 852 Hz, 941 Hz, 1209 Hz, 1336 Hz, and 1477 Hz. 12 allowed combinations have been defined. By using the frequency 1633 Hz, the letter symbols A, B, C and D are also obtained. The number of allowed frequency combinations is thus 16.

For telefax machines, a special adaptation function is specified in GSM networks, the analog signal of a machine being adapted to a digital radio channel by means of this function. Transmission of DTMF signals from a mobile station to the network, i.e. in the uplink direction, has also been specified. According to the specification, DTMF voices are not generated by the mobile station but by a mobile exchange, whereby the voice signals do not have to be applied via a speech coder. In depressing numeric pushbuttons of the mobile station during the speech connection, the mobile station transmits a message, and the mobile exchange generates the message after having obtained a corresponding DTMF signal.

The problem with present-day networks is thus the transmission of DTMF signals in the downlink direction. This is specified in no manner in present-day mobile networks. It is true that DTMF signals travelling from the network to a mobile station reach the mobile station, but in a distorted form, since they have to travel, on the network side, via a speech coder and thereafter via a speech decoder in the mobile station. Due to the distortion, they do not fulfill the conditions set by DTMF detectors of a fixed network to detect DTMF signals. Transmission of signals in the uplink direction also presents problems despite the specification mentioned above: when the user uses the DTMF facility of the mobile station, the station transmits both the starting message and ending message of a DTMF signal, the mobile exchange acknowledging both messages with acknowledgement messages. Accordingly, the transmission of a number comprising for instance ten characters requires a total of 40 messages. This loads the network.

The problem is emphasized especially in telephone systems in which a fixed connection between an exchange and subscriber stations in a fixed telephone network is replaced with a radio connection. The solution is referred to as a telephone system implementing a wireless subscriber connection, i.e. as the WLL system (Wireless Local Loop System). In the WLL system, a wireless fixed terminal equipment comprises a radio unit provided with an antenna and a telephone adapter, which connects a standard subscriber station to the terminal equipment. The subscriber station may be a conventional telephone set to which is connected a telephone answering machine. The user uses the subscriber station in the same manner as in a conventional fixed network, even if the subscriber line connection consists of a radio connection between the terminal equipment and a base station. The base station is connected to a special subscriber network element, which is connected to a standard telephone exchange. The WLL system can be constructed by applying for instance the components of the digital GSM system. The signalling of the WLL system is thus in accordance with the system concerned. In the WLL system, transmission of DTMF signals from the network over the radio path to a subscriber station would be extremely desirable.

One proposed solution for solving the presented problems is disclosed in European Patent Application 534 852. According to it, a DTMF detector and a DTMF coder are provided at the transmitting end, in the transcoder of a base station, in addition to a speech coder. The minimum period set for the detector to detect a DTMF signal is short, only 5 ms. When the detector detects a DTMF signal arriving from the network, it gives a control signal to the DTMF coder associated with the speech coder and to the transmitter. The DTMF coder thus establishes a frame, which resembles a SID frame and contains information on the detected DTMF. The transmitter, as controlled by a controller, selects this DTMF frame resembling a SID frame instead of a speech frame.

The fields of such a DTMF frame are shown in FIG. 4. The first three fields A, B and C correspond to the fields of the SID frame of FIG. 2, the field A comprising 95 bits thus containing the SID frame identifier, field B containing information on the background noise quality, and field C on the background noise level. As distinct from the frame of FIG. 2, a DTMF frame according to the European Patent Application contains additional fields D, E and F. Field D contains a DTMF frame identifier, which comprises 8 bits each being in 1-state. Field E contains a DTMF frequency pair code, which comprises 4 bits, whereby there may be 16 frequency pairs. The four-bit field F indicates the DTMF voice duration as multiples of 5 ms.

At the receiving end, the DTMF frame is identified by means of the SID frame identifier (field A) and the DTMF frame identifier (field D). The 'code' parameter indicated in field E defines the DTMF frequency pair in question, and the 'duration' parameter indicated in field F indicates which periods of the 20 ms frame divided into periods (subframes) of 5 ms contain DTMF signal. At the reception, the DTMF signal according to the code of field E is generated for those 5 ms periods which contain DTMF signal according to the duration of the DTMF signal. For the other periods of the frame, background noise defined by the SID parameters is generated.

A disadvantage of this known solution is that errors caused by the radio path are not taken into account. If erroneous DTMF frames are occasionally received at the receiving end, the regeneration of a DTMF signal, performed at the receiver, may become problematic, since successive frames are in no manner interlinked. There is no way of knowing for certain how long the same DTMF signal has been received or should have been received and if a new DTMF signal has already begun. The code of a DTMF signal may be the same in successive DTMF frames even if two separate DTMF signals were concerned. According to the recommendation CEPT T/CS 46-02, the conditions of reliable DTMF detection are that a DTMF signal endures more than 40 ms and that it is preceded by a state, which endures more than 40 ms and contains no voice frequency signal, or which is a detection state of a different voice frequency signal. Since the detector at the transcoder of the transmitting end uses at least 5 ms for DTMF signal detection, there is no time to detect the signal if it begins during the last period of 5 ms of the frame. Consequently, DTMF signal may occur at the end of the frame for a period of less than 5 ms, this signal travelling through the speech coder-decoder chain and being distorted. Immediately after occurs pure voice frequency signal generated on the basis of the received DTMF frames. If a pause of more than 40 ms is not maintained between the distorted DTMF signal and the pure DTMF signal, the detection of the DTMF signal at the subscriber end may fail altogether. Also, in the prior art solution, it is not checked at any stage if a DTMF signal arriving from the network to the transmitting end has endured more than 40 ms. In the transcoder of the transmitting end, it is thus possible to detect for instance a DTMF signal enduring less than 20 ms and transmit it forward over the radio path all the way to a subscriber station. In the subscriber station, the voice is not recognized as a DTMF signal, whereby it is disturbingly audible in speech.

SUMMARY OF THE INVENTION

The object of the present invention is such a method for transmitting DTMF signals over a digital radio path that exhibits no disadvantages associated with the prior art arrangements and that is suited for transmitting voice frequency signals reliably both in the uplink and downlink direction.

The defined object is achieved with the method disclosed in claim 1.

According to the method of the invention, in detecting the same DTMF signal at the transmitting end, successive DTMF frames relating to this signal are established, these frames being modified SID frames, and individual linking information is added to each frame in addition to the frequency pair information of said DTMF signal, this individual linking information indicating the duration of the DTMF signal from the first detection time period of the first modified SID frame to the frame concerned, including said frame. The individual linking information, which is a group of parameters, thus interlinks successive DTMF frames relating to the same DTMF signal. At the receiving end, in receiving DTMF frames, it is calculated at each error-free frame how long the DTMF signal has been received or should have been received. Only when the individual linking information of a received frame indicates that the duration of the DTMF signal is longer than the threshold value, for instance 40 ms, the DTMF signal indicated by the frequency pair information of the received frames is generated to a subscriber station. During the waiting period, background noise is generated.

BRIEF DESCRIPTION OF THE DRAWINGS

In the following, the invention will be described in more detail by means of a preferred embodiment of the invention with reference to the accompanying drawing, in which FIG. 4 shows a SID frame adapted for transmitting DTMF information, FIG. 6 shows a SID frame adapted according to the invention for transmitting DTMF information, FIG. 7 shows the form of a DTMF frame.

The conditions of DTMF detection are that a DTMF signal endures more than 40 ms and that it is preceded either by a state enduring more than 40 ms, not containing a voice frequency signal, or by a detection state of a different voice frequency signal. In FIG. 5, in which the same reference numerals as in FIG. 1 are used when applicable, an incoming audio signal is monitored by a controller 51, which contains a DTMF detector. When the detector detects a DTMF signal, it identifies the frequency pair in question at the same time. The controller 51 notifies the DTX control and operation block 4 by means of a DTMF flag that a DTMF signal is arriving. In response to the flag, the block 4 sets a flag SP to a such a state that a channel coding block 5 knows that the transmitted traffic frames are adapted SID frames containing DTMF information, and thus the block 5 does not perform channel coding in the same manner as on a pure SID frame. This type of frames will be referred to as DTMF frames below.

Figure 1:
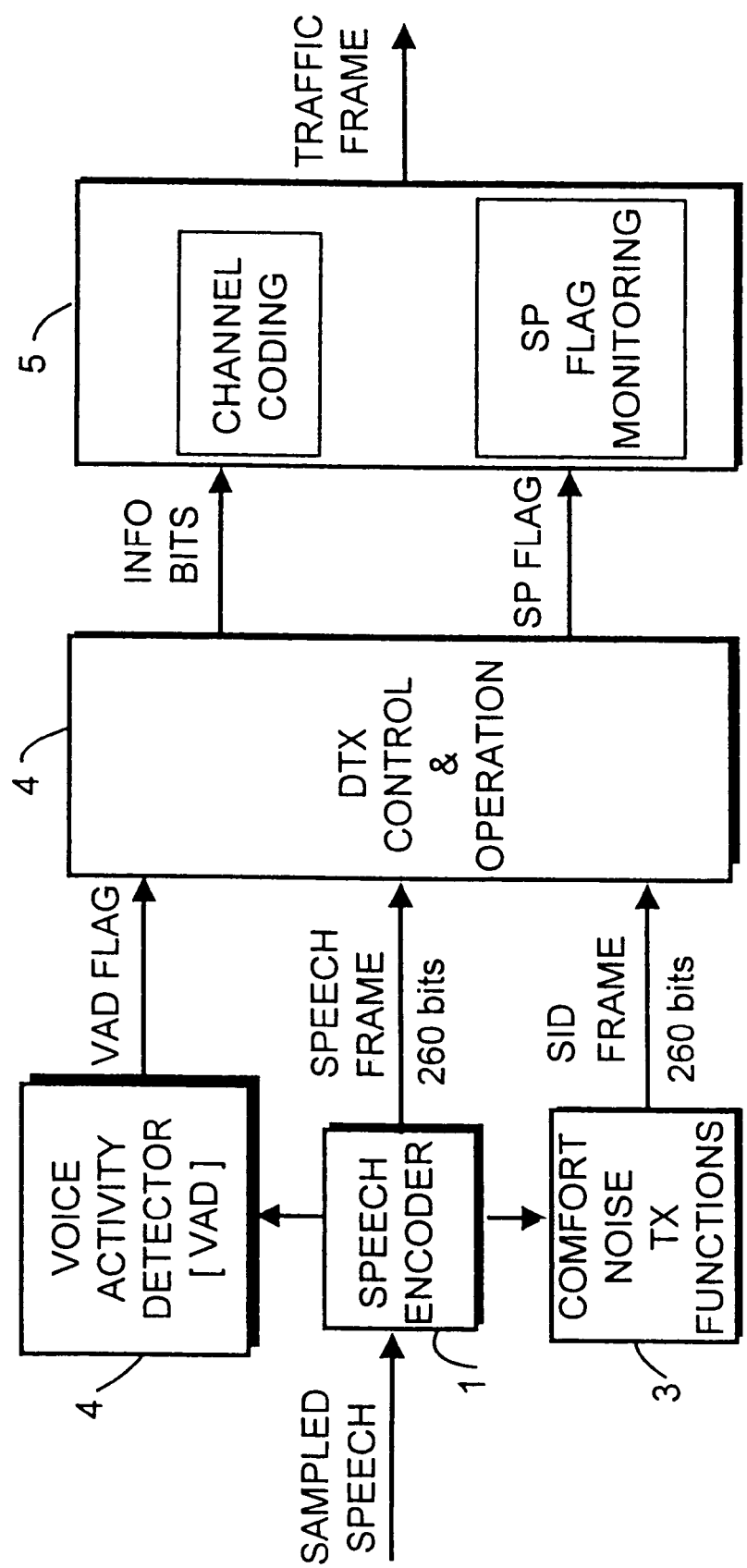
FIG. 1 shows speech processing at the transmitting end in a known system.
Figures 2, 3:
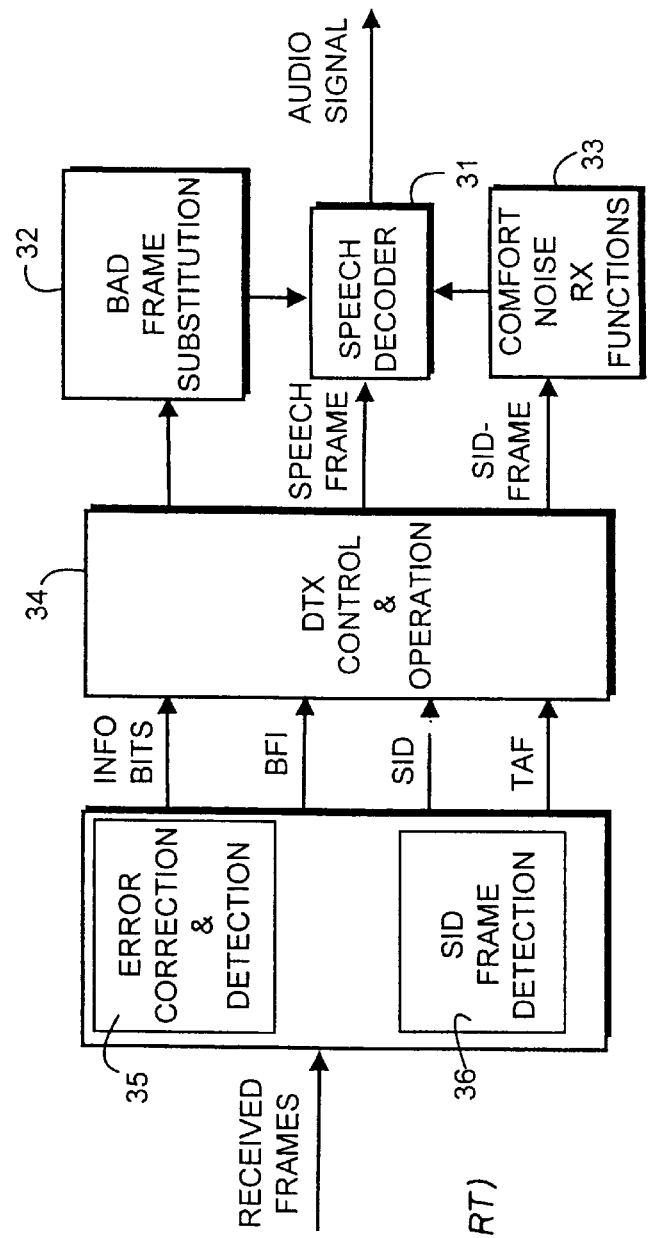
FIG. 2 shows a known form of a SID frame.
FIG. 3 shows speech processing at the receiving end in a known system.

On the basis of the VAD and DTMF flags, the DTX control and operation block 4 must be able to apply the correct info bits to the channel coder 5 and to set the flag SP to be such that DTMF frames and not SID frames are transmitted as traffic frames during a speech pause. The block 4 must thus perform the logical deduction according to the table of FIG. 6. In the example, the value 0 of the VAD flag indicates that the voice activity detector 4 has detected a pause and the value 1 of the flag indicates that the detector 4 has detected speech. The value 1 of the DTMF flag indicates that a DTMF signal has been detected and correspondingly, the value 0 indicates that the mentioned voice frequency signal has not been detected. The value 0 of the SP flag indicates that the transmitted traffic frame is a SID frame. Such arrangements are implemented in the block 4 that setting the flags in the manner shown in table 6 produces the situation that SID frames are transmitted only when speech or a DTMF signal is not detected and DTMF frames are transmitted regardless of the VAD flag always when a DTMF signal is detected.

When the detecting section of the controller 51 has detected the DTMF signal, the controller notifies a DTMF coder 52 of the frequency pair, which is a notification of the DTMF character, and of the duration of the DTMF signal. If the signal ends too early, for instance in less than 40 ms, the controller 51 gives the DTMF coder a command to transmit a SID frame without DTMF information.

The notification of the detected DTMF is transmitted in frames resembling a SID frame, which are referred to as DTMF frames. The form of a DTMF frame is shown in FIG. 7. The information contents of the fields A–E are essentially the same as in the prior art frame shown in FIG. 4. Thus, in addition to the SID frame identifier included in field A and the background noise parameters indicated in fields B and C, the frame contains a DTMF frame identifier (13 bits) in field D, and a DTMF signal code (4 bits) in field E, by means of which the frame is identified as a DTMF frame and it is recognized which DTMF signal is in question.

According to the invention, individual linking information is added to a DTMF frame, this linking information indicating, in the manner described below, the duration of the DTMF signal from the first detection time period of the first DTMF frame to the frame concerned, including said frame. The individual linking information, which is a group of parameters, thus interlinks successive DTMF frames relating to the same DTMF signal. Fields F, G and H are thus defined in a frame. The linking parameters are disposed therein: the parameter 'Order' (3 bits) in field F, the parameter 'Start' (2 bits) in field G, and the parameter 'Duration' (2 bits) in field H. The parameter 'Order' determines which of the frames relating to the same DTMF signal is in question. The parameter 'Start' determines the starting moment of the DTMF signal, i.e. how many 5 ms periods the first frame belonging to the same DTMF signal included. The parameter 'Duration'correspondingly determines, with an accuracy of 5 ms, how long a DTMF voice the frame concerned contains. All the 24 bits relating to the DTMF signal, i.e. the bits of the fields D–H, are disposed among the bits of the class Ia, which have the best error protection. The rest of the bits of the frame are set to zero.

Figure 8:
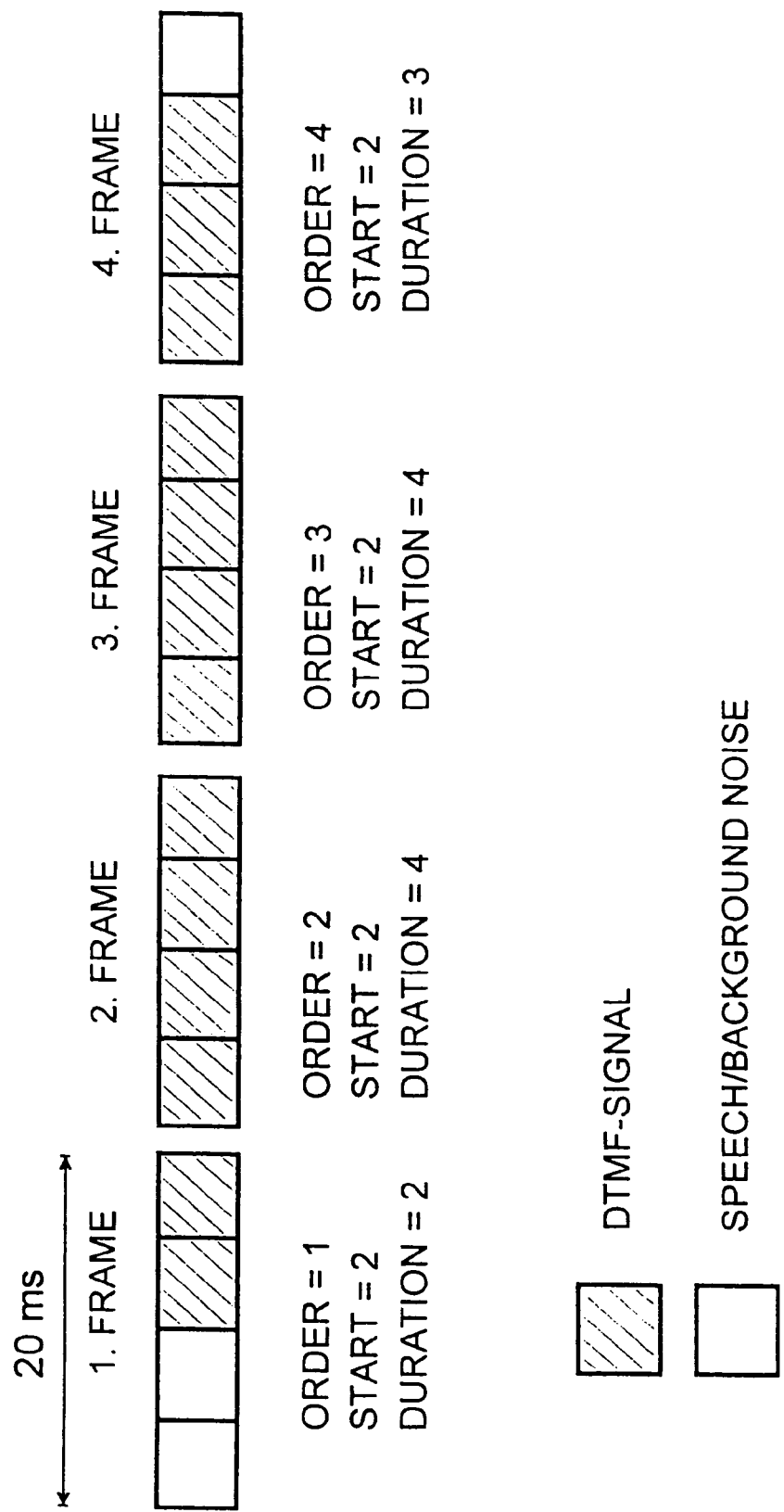
FIG. 8 shows the linking information added to the DTMF frame.

The linking is illustrated in FIG. 8, which shows the parameter values set by the DTMF coder 52 in a DTMF frame when the DTMF detector has detected the DTMF signal appearing in the figure. During the first frame, the DTMF detector, the detection frequency of which is 5 ms, has detected in the third subframe that a DTMF signal is arriving. The duration of the signal extends to the third subframe of the fourth frame. The subframes containing the DTMF signal are indicated by oblique strokes, and the subframes containing speech/background noise are not indicated by oblique strokes. Each frame is established as a DTMF frame and numbered consecutively by the parameter 'Order'. The parameter 'Start' provided in each frame is the same, in this case 2, and it indicates that the first frame includes 2 subframes containing the DTMF signal, i.e. the duration of the signal in the first frame is 10 ms. The parameter 'Duration' indicates the number of DTMF subframes in each DTMF frame. In the second and the third frame the 'duration'=4, the DTMF signal thus arriving during the entire frame. In the fourth frame, the 'duration'= 3, this frame thus containing 15 ms of the DTMF signal. The sum of the 'Duration' values is 13, the total duration of the DTMF signal thus being 13*5 ms=75 ms.

In this manner, the DTMF frames relating to the same DTMF signal are interlinked by means of the parameters 'Order', 'Start' and 'Duration' contained by the DTMF frames. By means of these parameters, it is thus possible to know at any error-free frame how long the DTMF signal should have been received even if erroneous DTMF frames were occasionally received. The length of the received DTMF signal at a specific frame is thus unequivocally:

TDTMF=Start·5 ms+(Order−2)·20 ms+Duration·5 ms, if Order>2, and

TDTMF=Start·5 ms=Duration·5 ms, if Order<2.

Figure 5:
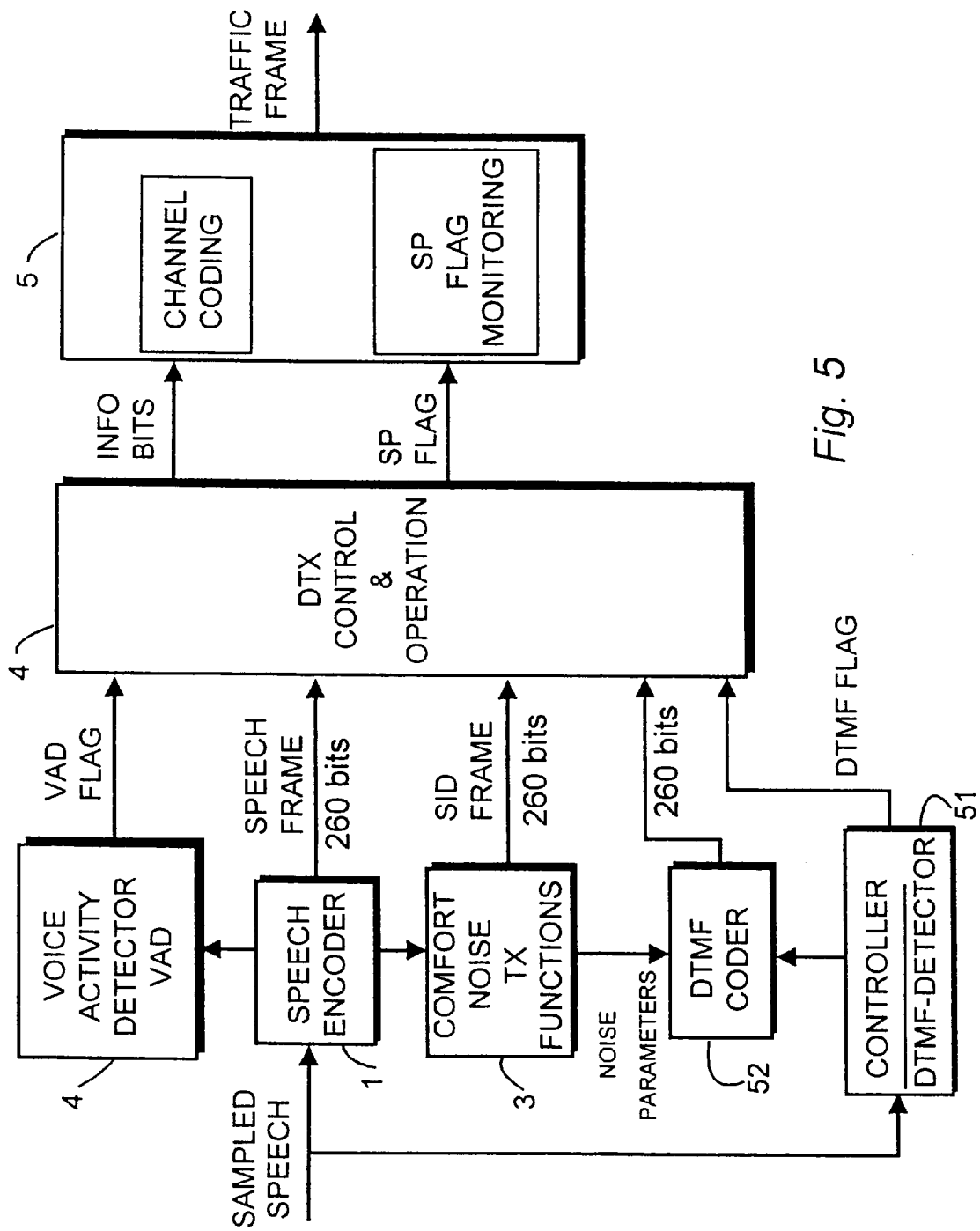
FIG. 5 shows speech processing at the transmitting end by using the circuit arrangement of the invention.

If the DTMF detector 51, FIG. 5, notices at the transmitting end that the DTMF signal is interrupted before it has endured more than 40 ms, the DTMF coder 52 stops the establishment of DTMF frames and their transmission is stopped. Next, the DTMF detector only reacts to such a new DTMF signal which starts only when a pause of more than 40 ms, not containing DTMF, has endured after the interrupted signal. Due to this procedure, the contents of the DTMF frames are unambiguous at the receiving end. As soon as at least one error-free DTMF frame is received, it is known that all subsequent frames, may they be erroneous or not, contain the DTMF signal as long as it has not already been received for more than 40 ms.

Figure 9:
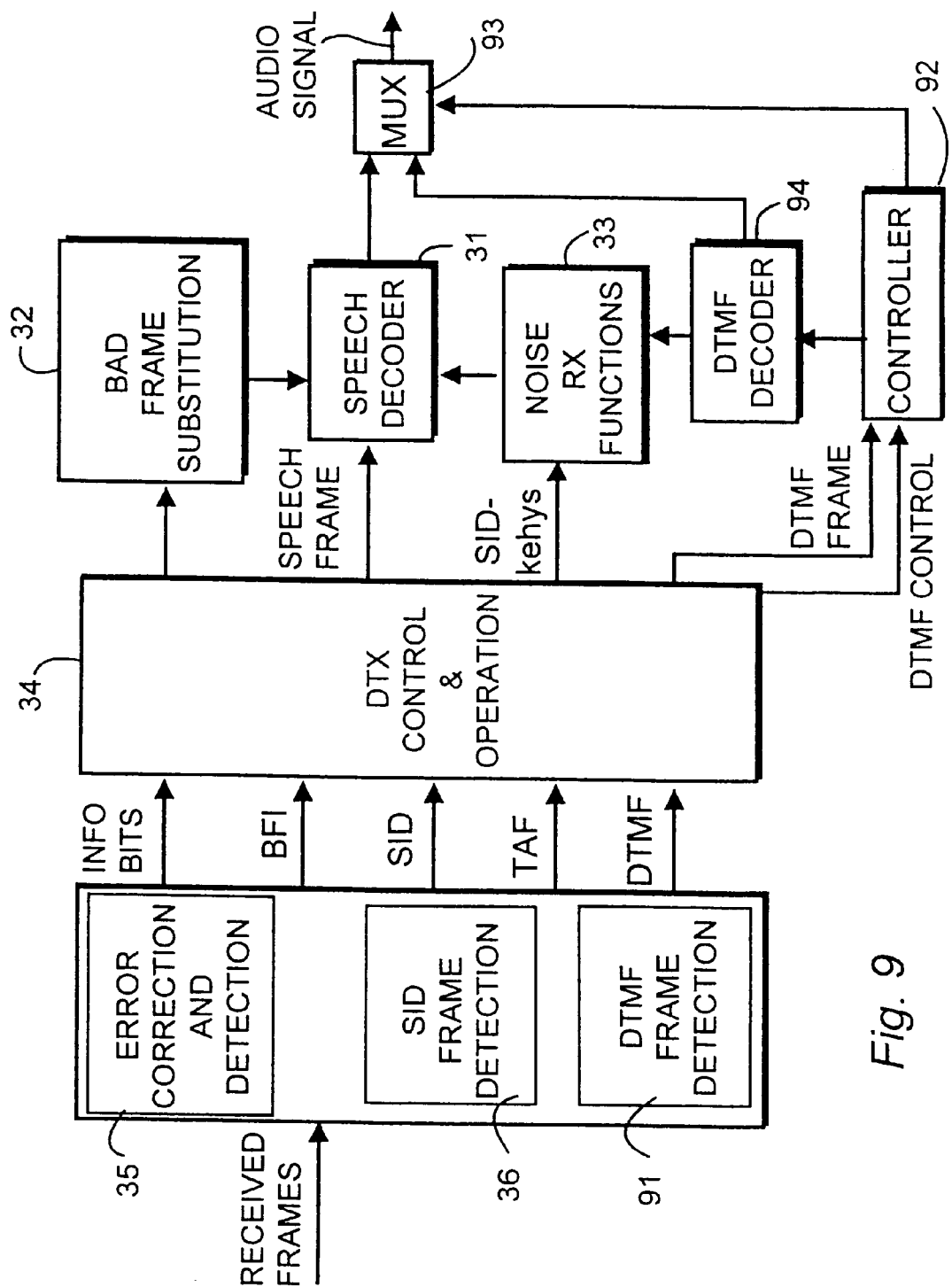
FIG. 9 shows the speech processing arrangement of the receiving end.

FIG. 9 shows the speech processing arrangement of the receiving end. A DTMF frame detecting section 91 must be incorporated into the processing block of received frames. If the SID frame detecting section 36 has noticed on the basis of a SID frame identification word that the arriving frame is a SID frame, the DTMF frame detecting section 91 examines whether the frame also contains a DTMF identifier, block D, FIG. 7. Two bits can be allocated for the flag indicating it. If the DTMF flag is 0, a DTMF frame has not been received, the speech processing thus progressing according to the prior art, i.e. the speech coder 31 generates background noise according to the noise parameters of the SID frame arriving at the noise RX function block 33. If the DTMF flag is 1 or 2, a DTMF frame has been received. Thus, the DTX control and operation block 34 transmits the DTMF frame and 2 DTMF control bits to a controller 92. The controller calculates from the frame parameters how long the same DTMF signal has been received and controls a multiplexer 93 acting as a switch accordingly.

The controller waits 40 ms first before switching the DTMF voice generated by a DTMF decoder 94 to the output. Time supervision ensures the fact that a pause of more than 40 ms is obtained between a distorted and a pure DTMF signal, which is a condition of reliable DTMF signal detection according to the CEPT recommendation. When waiting that a specific DTMF signal has been received for more than 40 ms before starting to generate it to the output and to the line, this ensures at the same time that signals the duration of which is less than 40 ms do not reach the subscriber station. During the waiting period, the controller adjusts the MUX 93 to multiplex the noise signal produced by the speech decoder 31 as an output. The speech decoder has received a command from the controller 92 to generate noise by means of the comfort noise parameters.

FIG. 5 showing the transmitting end is still referred to. The comfort noise parameters, included in DTMF frames, must have been generated at some earlier point. Previous acceptable comfort noise parameters must be stored in memory, for instance in the DTMF coder 52. If this is not done, it may occur that comfort noise parameters are generated during a DTMF signal, which is of course not desirable, since it would sound unpleasant at the receiving end. Such a procedure can also be followed that comfort noise parameters are not generated during a DTMF signal, since the VAD detector 4 does not interpret a DTMF signal as silence. Also in this case, previous usable comfort noise parameters must be stored in memory someplace.

According to a preferred embodiment, it is possible to follow such a procedure that if a DTMF signal has endured more than 40 ms at the transmitting end, the last DTMF frame can be transmitted again two more times after the signal has ended, as long as the next two 20 ms periods do not contain a new DTMF signal. This causes no additional loss of speech information, since at least two speech/noise frames are lost at the receiving end in any case after the generation of the DTMF signal has ended, when the buffering delay is removed.

When the same DTMF signal has been received at the receiving end more than 40 ms, it is necessary to check the DTMF frames received thereafter to find out whether they belong to the same DTMF signal or to the following one. The checking can be carried out by means of the parameters 'Order' and 'Start' of the invention. If the same DTMF signal is still in question, the parameter 'Start' must have the same value as at the previous received frame and the parameter 'Order' must be greater than or equal to the previous received frame. The equality condition is possible if the last DTMF frame has been transmitted again two more times at the transmitting end after the DTMF signal has ended.

The described invention is suitable for use in transmitting DTMF signals over the radio path in both directions in a digital mobile telephone network and especially in the wireless subscriber line system WLL utilizing the characteristic of such a network. The above description and the figures related thereto are merely intended to illustrate the present invention. Different variations and modifications of the invention will be apparent to one skilled in the art, without deviating from the scope and spirit of the invention disclosed in the appended claims.

I claim:

1. A method for transmitting DTMF signals over the radio path in a digital mobile telephone system, wherein the following steps are taken at the transmitting end, establishing, from an incoming signal, speech frames containing speech parameters during active speech and comfort noise frames containing background noise parameters during pauses, detecting, in detection periods, a DTMF signal possibly included in the incoming signal and establishing modified comfort noise frames, each of which contains both a DTMF identifier and DTMF frequency pair information in addition to comfort noise information, characterized by adding individual linking information to each successive modified comfort noise frame relating to the same DTMF signal, said individual linking information indicating the duration of the DTMF signal from the first detection time period of the first modified comfort noise frame to the frame concerned, including said frame, transmitting the established modified comfort noise frames as channel coded to the radio path.

2. A method according to claim 1, characterized in that the individual linking information is a group of parameters and that each linking parameter is located in a dedicated field in a modified comfort noise frame.

3. A method according to claim 2, characterized in that the first linking parameter 'order' indicates which of the frames of the successive modified comfort noise frames relating to the same DTMF signal is in question.

4. A method according to claim 2, characterized in that the second linking parameter 'start' indicates how many detection periods the first modified comfort noise frame relating to the same DTMF signal contains.

5. A method according to claim 2, characterized in that the third linking parameter 'duration' indicates how many detection periods the frame concerned contains.

6. A method according to claim 1, characterized in that if the duration of a detected DTMF signal is shorter than a first set reference period—preferably 40 ms—the establishment of modified comfort noise frames and their transmission to the radio path is interrupted.

7. A method according to claim 1, characterized in that modified comfort noise frames relating to a new DTMF signal are established and transmitted to the radio path only when a second set reference period—preferably 40 ms—has elapsed from the ending of the previous DTMF signal.

8. A method for transmitting DTMF signals over the radio path in a digital mobile telephone system, wherein the following steps are taken at the receiving end, checking if a received comfort noise frame contains a DTMF identifier and classifying the comfort noise frame containing said identifier as a modified comfort noise frame, detecting the DTMF frequency pair information in the modified comfort noise frame and generating a DTMF voice frequency signal corresponding to said frequency pair information, characterized by analyzing at each received modified comfort noise frame the individual linking information included in the frame, said individual linking information indicating the duration of the transmitted DTMF signal from the first received modified comfort noise frame to the frame concerned, including said frame, generating a DTMF voice frequency signal only when the analyzed individual linking information indicates that said duration exceeds a set threshold value, preferably 40 ms.

9. A method according to claim 8, characterized in that the individual linking information is a group of linking parameters, in which each linking parameter is located in a dedicated field in a modified comfort noise frame.

10. A method according to claim 9, characterized in that in each modified received frame:

the first linking parameter 'order' indicates which of the frames of the received successive modified comfort noise frames relating to the same DTMF signal is in question, the second linking parameter 'start' indicates how many detection periods the first modified comfort noise frame relating to the same DTMF signal contains, the third linking parameter 'duration' indicates how many detection periods the frame concerned contains.

11. A method according to claim 10, characterized in that the length TDTMF of a received DTMF signal is as follows at a modified comfort noise frame:

TDTMF=Start·5 ms+(Order-2)·20 ms+Duration·5 ms, if Order>2, and

TDTMF=Start·5 ms=Duration·5 ms, if Order<2, wherein 5 ms is a detection period of the DTMF detector at the transmitting end, and 20 ms is the duration of a modified comfort noise frame.

12. A method according to claim 8, characterized in that when the analyzed linking information indicates that said duration is shorter than the set threshold value, background noise is generated.

13. A method according to claim 8, characterized in that when the individual linking information analyzed from a received modified frame indicates that said duration exceeds the set threshold value, a DTMF signal is generated despite possible occasionally received erroneous modified frames.

* * * * *